OR 3,653,000

United States Pa[tent]

Kielar et al.

3,653,000

Mar. 28, 1972

[54] DATA STORAGE AND DISPLAY SYSTEM

[72] Inventors: Kenneth Kielar, Norridge; William Milleker, Chicago, both of Ill.

[73] Assignee: Motorola, Inc., Franklin Park, Ill.

[22] Filed: June 9, 1970

[21] Appl. No.: 44,714

[52] U.S. Cl. ....................340/172.5

[51] Int. Cl. ....................G06f 3/14

[58] Field of Search ....................340/172.5, 311, 312

[56] References Cited

UNITED STATES PATENTS

| | | | |
|---|---|---|---|
| 3,573,739 | 4/1971 | Zeitlin | 340/172.5 |
| 3,504,346 | 3/1970 | Parsons et al. | 340/172.5 |
| 3,436,736 | 4/1969 | Platt et al | 340/172.5 |
| 3,418,650 | 12/1968 | Rich et al | 340/311 |
| 3,092,689 | 6/1963 | Sandstrom | 340/312 X |

*Primary Examiner*—Paul J. Henon
*Assistant Examiner*—Ronald F. Chapuran
*Attorney*—Mueller and Aichele

[57] ABSTRACT

A data storage and display system utilizing a memory register for receiving names of personnel in response to coded cards having indicia corresponding to alphanumeric characters and storing the information indicative of each alphanumeric character and displaying the same on a display screen in alphabetical order to indicate to other personnel the names of those registered. A permanent memory in combination with a memory register and shift register operate cyclically to insert new names in the memory in alphabetical order automatically upon insertion of a particular coded card into a card reader.

18 Claims, 14 Drawing Figures

INVENTORS.
KENNETH KIELAR
WILLIAM MILLEKER

BY Mueller & Aichele

ATTORNEYS.

INVENTORS.
KENNETH KIELAR
WILLIAM MILLEKER
BY Mueller & Aichele
ATTORNEYS.

INVENTORS.
KENNETH KIELAR
WILLIAM MILLEKER
BY Mueller & Aichele
ATTORNEYS.

INVENTORS.
KENNETH KIELAR
WILLIAM MILLEKER
BY Mueller & Aichele
ATTORNEYS.

INVENTORS.
KENNETH KIELAR
WILLIAM MILLEKER
BY Mueller & Aichele
ATTORNEYS.

INVENTORS.
KENNETH KIELAR
WILLIAM MILLEKER
BY Mueller & Aichele
ATTORNEYS.

INVENTORS
KENNETH KIELAR
WILLIAM MILLEKER
BY Mueller & Aichele
ATTORNEYS

INVENTORS.
KENNETH KIELAR
WILLIAM MILLEKER
BY Mueller & Aichele
ATTORNEYS.

INVENTORS.
KENNETH KIELAR
WILLIAM MILLEKER
BY Mueller & Aichele
ATTORNEYS.

INVENTORS.
KENNETH KIELAR
WILLIAM MILLEKER

BY Mueller & Aichele
ATTORNEYS.

INVENTORS.
KENNETH KIELAR
WILLIAM MILLEKER

BY Mueller & Aichele
ATTORNEYS

DATA STORAGE AND DISPLAY SYSTEM

BACKGROUND OF THE INVENTION

This invention relates generally to a data storage and display system having visual read out of the information stored therein.

The illustrated embodiment of this invention has particular utility when used to register personnel in and out of establishments, and is particularly useful for registering the whereabouts of important personnel, such as doctors, who are on the premises of a hospital, or the like, so that during the time they are on the premises important incoming messages can be brought to their attention. The illustrated system also provides means for other medical personnel in the hospital to know which doctors are on the premises and can be reached in cases of emergencies, particularly situations requiring the special skills of one or more of the doctors who are so registered. The data storage and display system of this invention can be used to register in and out any class of personnel, whether doctors or not, and store all information in alphanumeric order to be displayed on a plurality of strategically placed monitors throughout the hospital.

Heretofore, in and out registers at hospitals, or the like, which allow doctors to receive messages, and allow hospital personnel to know the presence of the doctor, have taken several different forms. However, the prior art attempts to provide a practical register system have many difficulties and limitations. For example, in most of these systems, a register unit is located at one or more of the entrances to the hospital so that doctors passing through these entrances can register in and out by actuation or manipulation of suitable identification means. These doctor register units, in many cases, have a dial apparatus which the doctor will manipulate by dialing a selected number identifying himself. Upon dialing the appropriate identification number, the doctor is also required to actuate either register-in or register-out switches to energize a light indicator mounted on an annunciator panel which has the doctor's name posted thereon. This light is located either to the left or right of the doctor's name, but in any event immediately adjacent thereto to indicate, for example, that a doctor is in the hospital when the light is lit. When using this type of system, in every instance, a nameplate is required to be posted on the annunciator panel showing the doctor's name, and the doctor is assigned the appropriate identification number indicative of the location of his nameplate on the annunciator panel. The number of doctors which can be registered in this system is naturally limited by the number of locations for doctors' names on the annunciator panel. That is, if there are 100 doctors who may register in, the annunciator panel must have space for 100 names, knowing full well that at any given time the average register-in count is 50 doctors, for example. The system is therefore required to have twice as many entries as would be registered in at any given time on the average. This is inefficient in that it requires additional equipment which increases the initial cost of such system and which can malfunction. Also, it may be somewhat confusing, at the outset at least, to scan the annunciator panel visually to pick out a particular name.

Doctor register systems heretofore known have not provided means for allowing doctors to indicate that they are in special or restricted areas, such as operating rooms, or the like, and cannot be disturbed while there.

SUMMARY OF THE INVENTION

Accordingly, it is an object of this invention to provide an improved data storage and display system which can be used as a register in and out system for personnel on particular premises.

Another object of this invention is to provide an improved data storage and display system for use as a register-in and register-out system which can be utilized by more personnel than the system capacity to display registered in personnel.

Another object of this invention is to provide an improved doctor register-in and register-out system for hospitals, or the like, which also allows the doctor to register his whereabouts at particular locations within the hospital where he is not to be disturbed.

Yet another object of this invention is to provide an improved doctor register-in and register-out system responsive to a precoded card, or the like, carried by the doctor and merely inserted at a register-in and register-out station located at one or more entrances of the hospital.

A still further object of this invention is to provide a register-in and register-out system where names can be received at random in any alphabetical order and these names will automatically be placed in permanent memory storage in alphabetical order to be displayed on a video read out.

A feature of this invention is the use of a punched card which, when inserted a first time into a register-in station, causes the doctor's name automatically to be placed in the system in alphabetical order thus to be displayed at a video read out unit, and insertion of the card into the register unit a second time, causes the doctor's name automatically to be removed from the system, thus eliminating his name from the visual read out. This latter action will automatically shift the other names in the system below the name removed up one line to maintain the alphabetical listing of the names still registered in.

Another feature of this invention is the provision of circuit means to effectuate the storage of information, precoded in accordance with the letters of the doctor's name, in alphabetical order in a memory storage bank to be displayed in alphabetical order at a television monitor.

Briefly, the data storage and display system of the illustrated embodiment of this invention is a status information display system used to register data, such as doctors' names, in alphabetical order to be displayed at a visual read out, such as, for example, a television monitoring screen. The data storage and display system will be referred to herein as a doctors' register system, but it will be understood that any personnel information may be stored within this system. Names previously stored within the system can be flashed by actuation of a flashing circuit to indicate to the person whose name is flashing that a message is waiting for him or her. A plurality of status display units, i.e. television monitors, are preferably located throughout the hospital readily to provide visual read out of all doctors' names, or other key personnel, who are "registered in."

The doctors' register system disclosed herein is illustrated as having a basic size of 60 names which can be displayed at any given instance in three columns of 20 names each. Expansion of the number of names which can be displayed, however, is accomplished in 60 name increments up to a total capacity of 240 names in any given system. This is, of course, limited only by circuit capacity and as many name locations as desired can be formed in larger systems. Each name within a 60 name group is generated electronically, i.e. each letter of the name is formed by a character generator, in response to a memory generator unit which receives and stores information indicative of a doctor's name who has registered in. The memory generator includes X and Y coordinate axes address lines such that the cross-over point of each coordinate axes represents the particular location of the surface of the display screen of a television read out unit. Each cross-over point of the memory unit is, in this example, six bits deep to provide capabilities of storing information as to the particular character to be displayed at a particular location on the screen. The character stored in this manner is represented by a binary code. This binary code for each character forming a name preferably is obtained by punched information on a plastic card, or the like, which is carried by the doctor. The card is inserted into a register-in/out card reader whereupon the punched information on the card is converted into binary code signal information to be stored with the memory unit.

In the basic system operation, each doctor and/or staff member to use the system is provided with an identification card. This card is inserted into a slot in any one of several in/out register units located at the various entrances to a hospital. As the doctor inserts the card, his name automatically appears on a television monitor near the register-in card reader unit. This verifies instantly to the doctor that he is registered in and that all other monitors within the hospital now display his name in alphabetical order. A person viewing any one of the monitors can readily identify any name listed thereon because all names are automatically arranged in alphabetical order, and only those personnel actually registered in will have their names so displayed. When a doctor desires to indicate that he is not to be disturbed, as for example when he enters the operating room, he can insert his card in a special register unit located at the entrance of the operating room. This will cause a special marking to appear before his name displayed on the monitors and thus notify other persons, including the operator, that he is not to be disturbed. Therefore, at a glance, personnel can determine exactly which doctors or staff members are in the hospital at any given moment, and if these doctors are in restricted areas, such as operating rooms, and cannot be disturbed.

If a doctor receives an important call and he is not registered in at the hospital at that moment, the switchboard operator can insert this information into the system so that the doctor's name will be stored in the memory unit thereof, but will not be displayed on the monitor screen. As soon as the doctor inserts his identification card into a register-in unit, his name will automatically appear on the screen and will be flashing on and off to indicate to the doctor that messages are now waiting for him. To register out of the hospital, the doctor again inserts his identification card into the in/out register unit, this occurring when he leaves the premises. This second insertion of the card will cause his name automatically to be removed from the memory unit and also causes the other names remaining in the system to be shifted or rearranged in alphabetical order to close the space that would be left by the doctor's name who is registering out. The doctor need not register out at the same unit which he registered in.

Although the doctor's register system disclosed herein is essentially a video communication system, no video camera apparatus is required. Characters displayed on the monitor units are generated by electronic character generators in accordance with precoded information corresponding to the characteristics of each character being displayed.

The names of doctors who have messages waiting for them but who are not at present registered in at the hospital, are stored in the memory unit of the system, but these names are not displayed at the monitor units. However, there is a blank space on the monitor units where the name would appear. In order to display the names so held in the memory but not displayed, the operator control station may include a switch which allows all names stored in the memory and not displayed, to be displayed, while all other names stored and displayed are not displayed at this particular moment. This prevents confusion of the operator in that only those names in storage having messages waiting will be displayed at a given instance.

To accomplish many of the novel aspects of this invention, the circuit arrangement includes means for developing control signals in response to coded signal information from a data input circuit to cause storage or deletion of such signal information in storage or memory circuit means in a predetermined order or array. Preferably, a plurality of full adder circuits are arranged so that each has a first input for receiving signal information already stored in said storage circuit means and also has a second input for receiving signal information from said data input circuit. There are interconnecting means for sequentially applying signal information from said storage circuit means to said first input of said adder circuits in a predetermined order and comparing this signal information with the signal information at said second input of said adder circuits. The comparison of these signals at the outputs associated with the plurality of adder circuits will develop either a first, or a second or a third control signal. The first control signal is responsive to the sameness of the signal information at said first and second inputs of said full adders to cause deletion of the signal information in said memory circuit means then being compared. The second control signal is responsive to a difference of signal information at said first and second inputs of said adders to develop a signal to cycle the signal information from said memory circuit means to a next position in the memory circuit means in the predetermined order. The third signal is responsive to the difference of the signal information at the first and second inputs of said full adders to develop a signal to cause insertion of the signal information from the input circuit into said memory circuit means.

DESCRIPTION OF THE PREFERRED EMBODIMENT

Figures 1, 2:
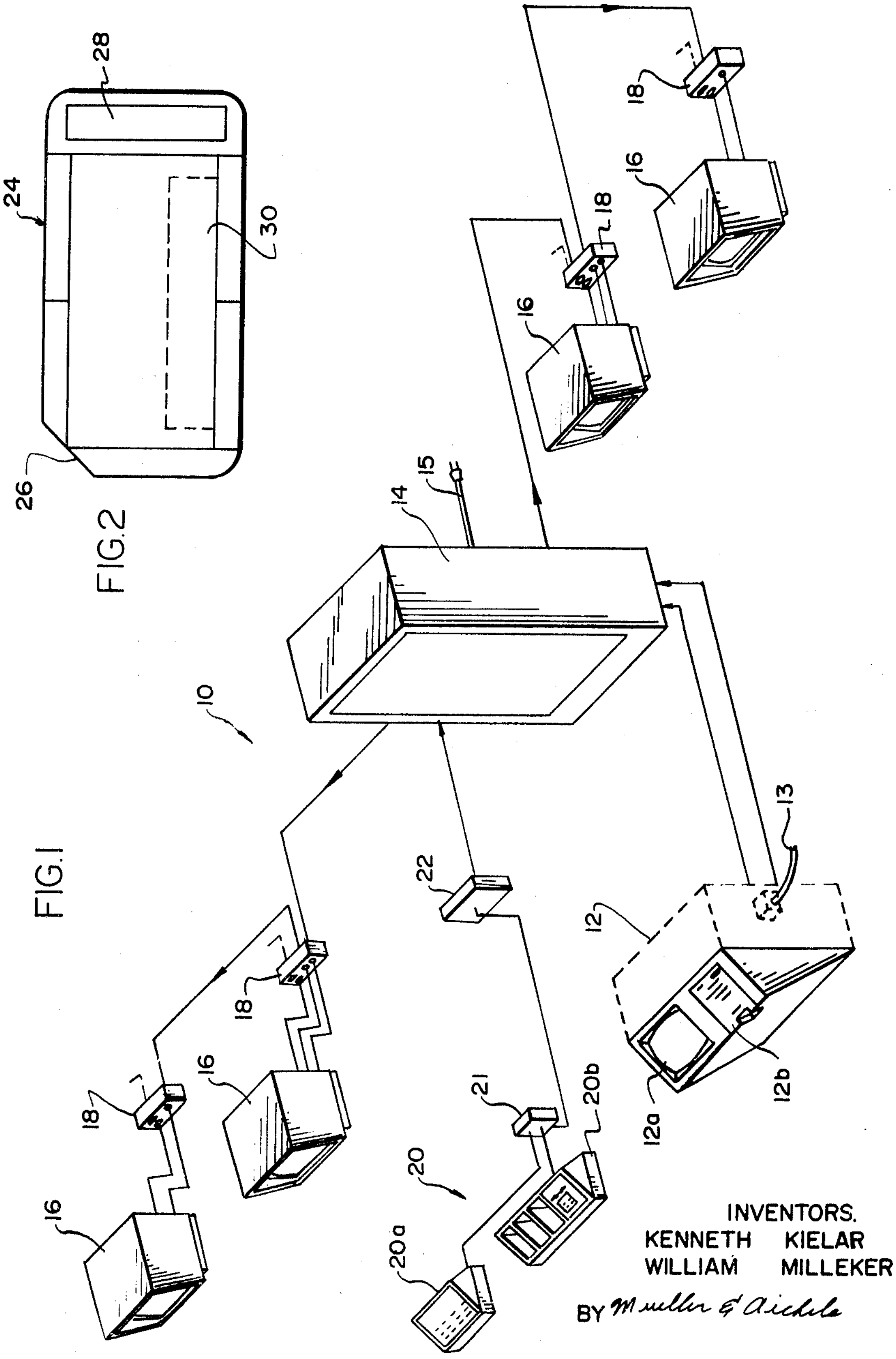
FIG. 1 is a perspective simplified block diagram of the data storage and display system of this invention.
FIG. 2 illustrates an identification card used with the data storage and display system of this invention.

Throughout this disclosure the larger numbers on the drawings are reference numerals and the smaller numbers designate terminal or circuit board connections.

Referring now to FIG. 1, a data storage and display system is designated generally by reference numeral 10 and is herein illustrated as being arranged for monitoring doctors' names registering in a hospital. The data storage and display system 10 includes a register-in station 12, which may be one of several in the system, powered by a conventional power source connected to a cable 13. The register-in unit 12 includes a monitor **12*a* which allows the doctor instantly to view the names presently listed in the system as well as to check and see that his name is properly inserted therein. Preferably, a card reader 12*b* is conveniently arranged in each of the register-in units 12 to receive an identification device, such as a plastic card 24, of FIG. 2, having printed indicia thereon as well as coded information to be sensed by the card reader 12*b***.

The coded information on the card is translated into digital signal information and delivered to a memory generator unit 14, powered by conventional 60 Hz. voltage applied to a power line 15. The memory generator unit 14 also includes character generator means which develop discrete electronic signals to be delivered to a plurality of television monitors 16 located strategically throughout the hospital in which the system is used. Each of the television monitors 16 may be connected to a junction box 18, such as a multi-convenience outlet, to form an interface between the memory generator unit 14 and each of the television monitors 16.

A switchboard station designated generally by reference numeral 20, includes an operator control console 20*a* and a card reader and card file 20*b* and may include one of the monitors 16. The card reader and card file 20*b* includes a plurality of receptacles for holding duplicate cards of each of the persons to use the system so that a particular person's name can be inserted into the memory of the system when messages come in and that person is not, at this moment, in the hospital. By so inserting the name and operating the control console 20*b* so that the name will appear in a flashing condition when the person inserts his card into the card reader 12*b*, that person is instantly apprised of the fact that a message is now waiting. Connected between the operator control station 20 and the memory generator unit 14 may be two or more control or junction boxes 21 and 22 providing means for connecting the necessary cables between these two units.

Preferably, the illustrated embodiment of this invention contemplates the use of the identification card 24, FIG. 2, to be inserted into the card reader 12*b*. The card 24 can be a plastic card having an indexing portion 26 and a signature patch 28. An area 30, confined by broken lines, may receive the coded information on the card to be translated into digital information and stored within the core memory of the system 10, and an area above the area 30 to receive conventional printed indicia such as the name of the hospital.

Use of the identification card illustrated herein provides a simple and convenient means to allow the carrier of the card to register in and out of the hospital. Also, persons who do not have a card with the proper code information on it cannot tamper with the information already within the data storage and display system. Preferably, the card includes features which distinguish it from other cards, such as department store or banking credit cards. For example, the embossing of general identification information must be located within an area 1½by 2¼inches as defined by the area 30. By so confining the identification information, the card reader 12*b* readily will identify the card as one belonging to the system.

In accordance with the illustrated embodiment of this invention, the data storage and display system 10 is capable of receiving names on a punched card at random and translating this information into data signals which are then compared with data signals already in the core memory and stored therein in alphabetical order. This alphabetical storage of names, regardless of the order in which they are inserted into the system, provides an easily viewable display on each of the monitors 16 allowing personnel quickly to scan the names to pick out a name in its logical alphabetical position.

Figure 3:
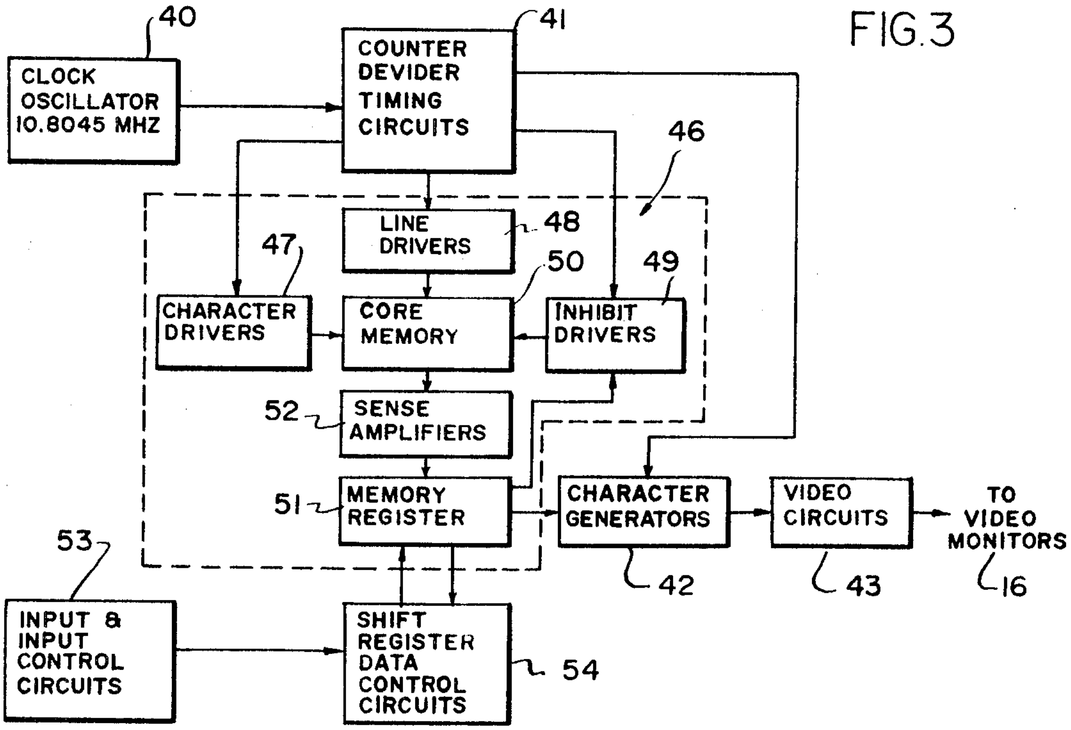
FIG. 3 is a simplified block diagram of a portion of the system of this invention used to receive and store information in alphabetical order.

FIG. 3 illustrates a simplified block diagram of a portion of the circuit arrangement contained within a memory generator 14 which performs the function of storing the names in alphabetical order, and generating electronic impulses to develop characters on the screen of the television monitor 16. The character generator will generate signals at video frequencies representing characters for application to a standard video monitor. Therefore, each of the monitors 16 of FIG. 1 may be a television receiver simplified in that the RF receiver section may be eliminated.

The first step in the system is to provide the necessary frequency or clock pulses for operation of the character generator and the memory storage of this invention. This is accomplished by providing a 10.8045 MHz crystal-controlled oscillator which serves as the master clock oscillator 40 of the system. All functions of the data storage and display system 10 are controlled by the master clock 40. The output of the master clock 40 is delivered to a series of counter and divider circuits 41 that effectively divide the basic frequency of the clock oscillator into all of the necessary timing increments required for the operation of the system. This includes the horizontal and vertical frequencies for the television monitors 16 as well as reset pulses for operation of each of the television monitors. Also, the counter and divider circuits 41 provide pulses for the character generator to display characters on the screen of the monitors, and provides means cyclically to read out and read in information within a core memory to display the names stored therein.

Figure 4A:
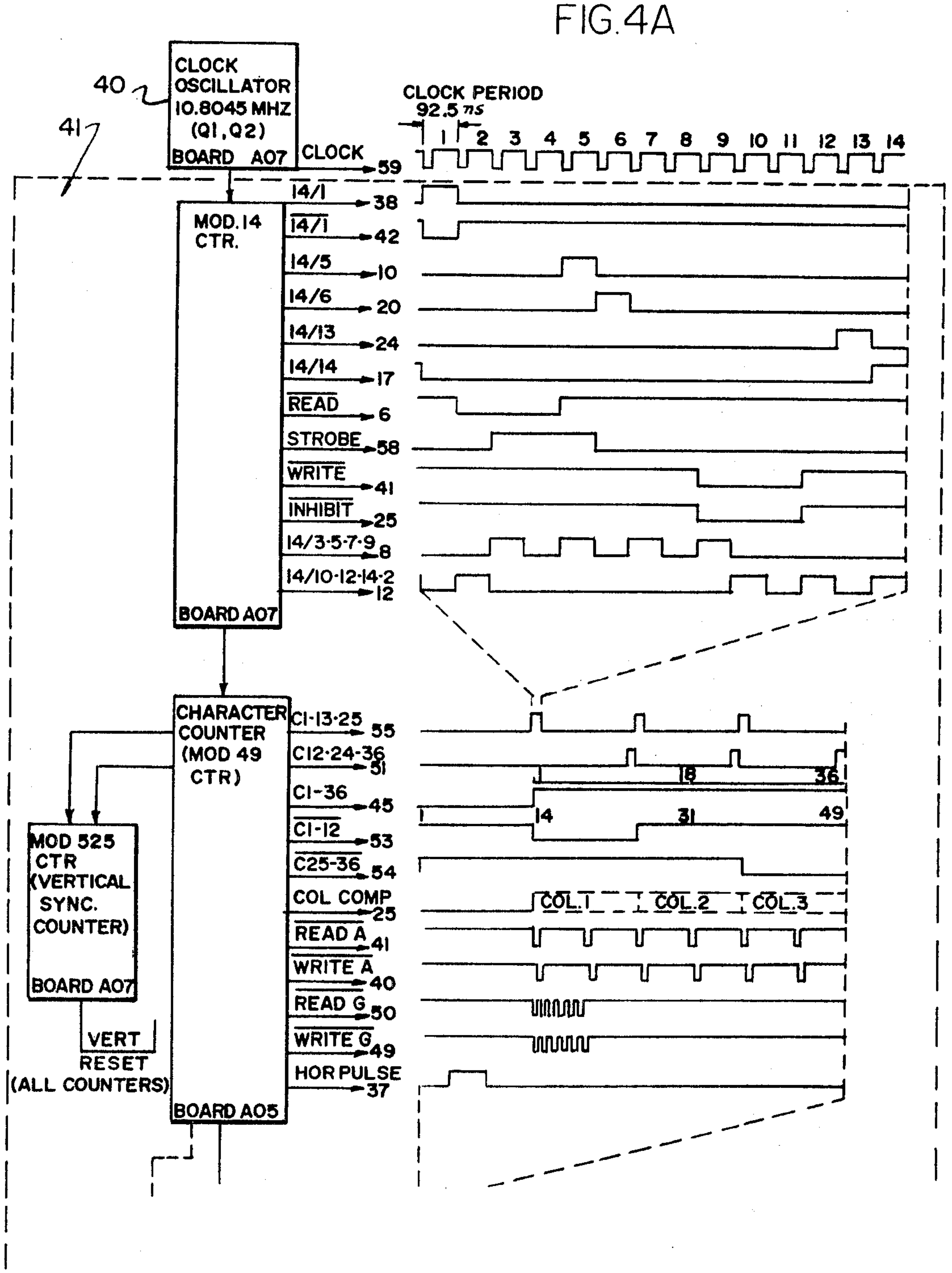
FIGS. 4A and 4B illustrate, in block diagram form, the clock pulses generated to create the time dependent functions of the data storage and display system of this invention.
Figure 4B:
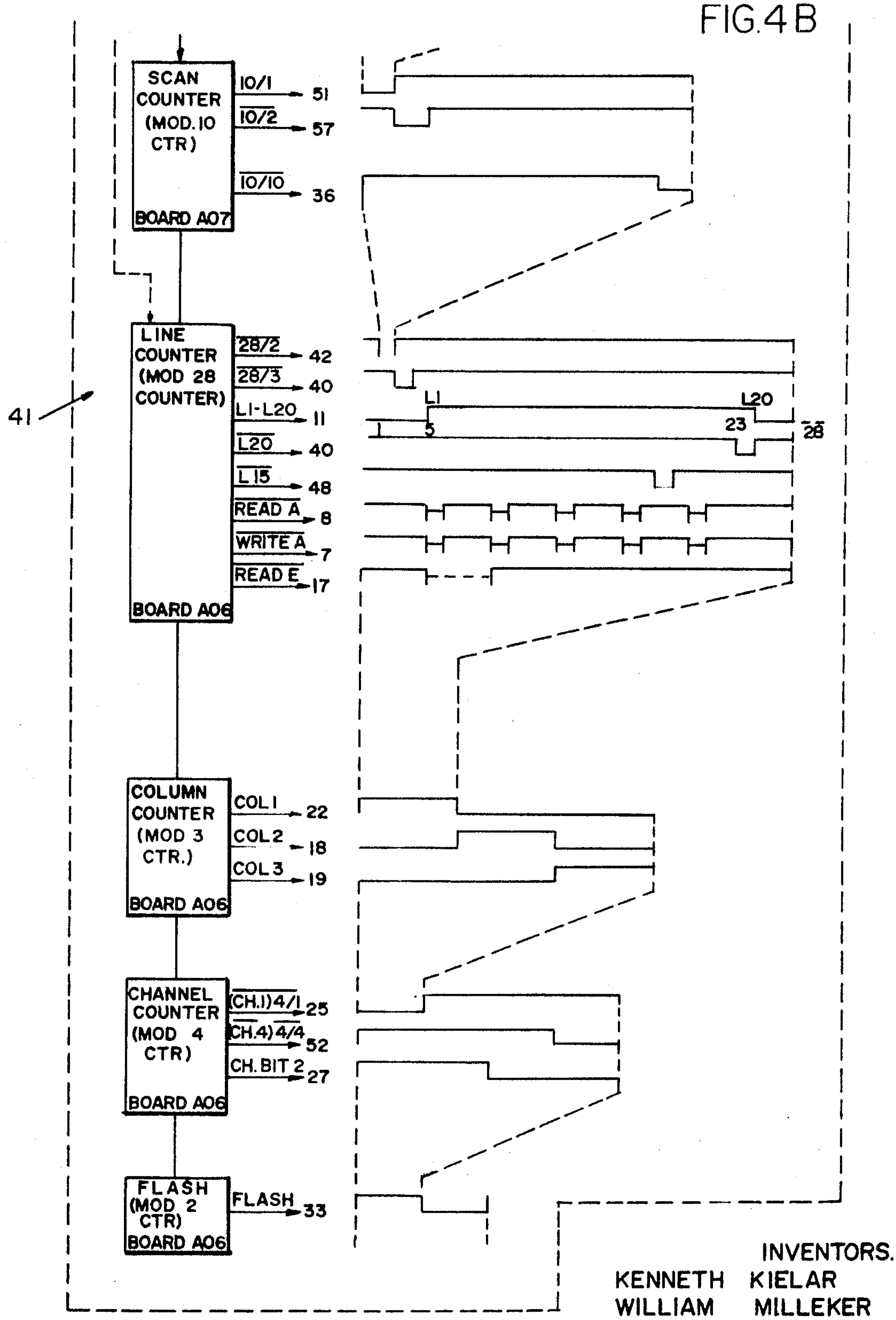

The output of the counter and divider circuits 41 are a plurality of different time duration pulses, as illustrated in FIGS. 4A and 4B with the various output circuit connections being illustrated, to be more fully described hereinbelow. One output signal of the counter and divider circuit 41 is connected to a character generator circuit 42 which electronically generates pulses which are applied to video circuit means 43 effectively to reproduce the characters of the alphabet, as well as numbers, on the screen of each of the television monitors 16. Also, the several different outputs of the counter and divider circuit 41 are applied to an alphabetical memory circuit which is designated generally by reference numeral 46. For example, one output signal is connected to a character driver circuit 47 while another output signal is connected to a line driver circuit 48 and a third output signal is connected to an inhibit driver circuit 49. The outputs of the counter and divider circuit 41 are sequentially applied thus causing the memory circuit 46 to cycle continuously to transfer data from a core memory 50, which may be of the permanent magnet torroidal type, to apply output signals to a memory register circuit 51 through a sensing amplifier circuit 52. Names previously inserted in the memory core 50 are continuously read out of the core at a rate of, for example, 60 times each second, and applied to the character generator which, in turn, cooperates with output pulses from the counter and divider circuit 41 to generate the appropriate characters. The character driver 47 and the line driver 48 are used to locate the set of memory cores required for each character to be generated during the read in and write cycles. The inhibit drivers 49 are used during the write cycle only and provide means for replenishing or restoring the information back into the magnetic core memory. For example, the sense amplifier 52 detects the presence of a signal, herein referred to as "1" bits during the recycle.

When the card 24, of FIG. 2, is inserted into a card reader 12*b*, of FIG. 1, an entry into the core memory 50 will take place. That is, an input and input control circuit 53 translates the information on the card 24 into pulse signal information preferably of the binary code type, and delivers this signal information to a shift register and data control circuit 54 which, in turn, delivers signals to and receives signals from the memory register 51. This will compare the information being inserted with that already in storage to produce the appropriate control signal to put the new information in storage in alphabetical order. The entire translation of the character data takes place while the memory read-write cycle is in progress. The memory circuit 50 thus stores the characters of all names which have been entered into the system while characters are sequentially read out for video presentation.

With reference now to the FIGS. 4A and 4B, which should be viewed together with FIG. 4A on top of FIG. 4B, the function of the counter and divider circuit 41 is more fully illustrated. A first divider circuit designated MOD 14 receives pulse signals from the clock oscillator 40 to develop the various output signals as illustrated adjacent each of the output lines, this illustrating only some of the outputs of the circuit. The output of the MOD 14 divider is delivered to a MOD 49 divider which, in turn, has its output delivered to a MOD 10 divider. Similarly, the output of the MOD 10 divider is delivered to the MOD 28 divider and therefrom to a MOD 3 divider, and thence to a MOD 4 divider, and finally, to a MOD 2 divider which provides a 2½cycles per second flash signal. It is this flash signal which is used to flash the name of a particular doctor on the television monitors to notify that doctor that a message is waiting. Each of the MOD counter dividers is designated by the number of pulses required at the input to produce a single output cycle therefrom. For example, the MOD 14 divider received 14 input pulses from the clock oscillator 40 for each cycle of its operation while the MOD 49 divider receives 49 input pulses from the MOD 14 divider for each cycle of its operation and so on. The counter-divider outputs are identified by numbers designating the MOD number plus the particular output signal. For example, 14/1 at the output of MOD 14 indicates that it is the first output signal derived from this divider. Pin numbers and signal names are shown for those typical outputs waveforms which are illustrated, and the period or time duration of each waveform is shown in a particular time sequence thus illustrating its relationship to other signals over a given time cycle. The square wave signals illustrated in FIGS. 4A and 4B preferably are in the order of 3 volts or more in magnitude with a low voltage or no voltage condition existing when the output is less than 1 volt.

The time duration between each pulse output of the clock oscillator 40 is 92.5 nanoseconds, and will be the shortest time interval within the entire system. The output of the clock circuit 40 is used only to drive the MOD 14 divider and counter which derives all other signals.

The first four outputs shown in FIG. 4A are designated 14/1, 14/$\bar{1}$, 14/5 and 14/6, and are individual counts generated by the counter to cyclically operate the core memory read out of alphabetically stored information. The character counter or MOD 49 counter divider is driven by the output of the MOD 14 counter-divider, and the converging dotted lines between the group of output signals adjacent the MOD 14 counter converging down to the top left hand signal adjacent the MOD 49 counter-divider illustrates the relative time interval relationship between the outputs of these two counter-dividers. The output of the MOD 49 counter-divider has a time interval of 63.5 microseconds and is equivalent to one horizontal scan and retrace time period for a television monitor, such as the monitor 16 of FIG. 1. All horizontal location data for the monitor display is derived from the outputs of the MOD 49 counter-divider.

The 36 count of output line C1–C36 determines the total number of characters along a horizontal scan of the television monitors 16. The arrangement selected here provides 12 character spaces for three adjacent columns of names with a space between each column, thus providing 11 spaces for letters of the alphabet for a person's name to be displayed. The pulse designated HOR is used as the horizontal sync for monitor display. Output C1–13–25 is normally low with positive pulses occurring during the first, 13th and 25th character periods. These positions represent the first character position in each of the columns in which names will be displayed alphabetically. The output C1–C12 represents the first 12 characters on a line and thus represents the first name displayed on the line. The READ A and WRITE A outputs provide timing and memory operations that are gaited by the MOD 14 counter-divider.

The MOD 10 scan counter is driven by an output from the MOD 49 character counter and is stepped through one cycle of operation for 10 input pulses applied thereto. The time duration for this counter is 63.5 microseconds which determines the time interval for one character line. The individual counts for the character line is seven scan lines for a vertical dot spacing of a character with three remaining counts for spacing between character lines. Each time the character counter cycles, the scan count is gaited with the character information to provide a new position on the character line. The method of generating character information for display on the television monitors 16 is the subject of another patent application assigned to the same assignee.

The output of the MOD 10 counter-divider is applied to a MOD 28 counter-divider. The MOD 28 counter-divider has a time interval of 16.6 milliseconds corresponding to the 60 Hz. frame rate of a television monitor 16. During normal system operation, the information is being displayed continuously and the MOD 28 line counter is reset by an output signal from the MOD 525 counter-divider for vertical sync. The arrangement includes the usual interlace scanning of the lines on the television monitor 16 for sharp character definition.

The output of the MOD 28 counter-divider is delivered to the MOD 3 counter-divider which steps once each time the line counter reaches its full 28 input pulses. The time duration of the MOD 3 counter is 50 milliseconds and is used to separate the data into three columns on the face of the television monitors 16. The column count occurs after all of the information of the particular column has been read out of the memory circuit 46 of FIG. 3, and all operations for each column are performed during the time interval of the column pulses 1, 2 and 3.

The output of the MOD 3 counter-divider is delivered to a MOD 4 counter-divider which functions similar to the column counter except that four outputs are used to control the handling of the names stored in the system in four groups of 60 names each thus providing a total capacity for the system of 240 names. The output of the MOD 4 channel counter delivered to a MOD 2 flash counter which provides output pulses at a 2½cycle rate which is used to flashingly control any one of the names displayed on the television monitors 16 to gain the attention of personnel viewing the monitor to indicate to the person whose name is flashing that he has a message waiting for him at the switchboard.

Referring again to FIG. 3, the read out cycle or operation of the core memory 50 is a destructive process and the information taken out of the core memory must be placed temporarily in the memory register 51. Also, in accordance with an aspect of this invention, the information placed in the memory register 51 is delivered to the character generators 52 to produce the appropriate alphanumeric character. A write cycle follows immediately to replace the information back in the core memory 50 where it will remain until read out occurs again during a subsequent cycle. The read-write cycle of the core memory 50 takes place at a rate of 60 times per second and, most advantageously, a new name can be inserted into the core memory 50 without changing the cycle rate thereof. That is, the core memory 50 is operated through 60 read and write cycles each second regardless of the number of names stored therein.

Because each character developed by the character generator 42 is formed of a 5 × 7 matrix, consisting of 5 dots in width and 7 dots or lines in height, each core memory associated with a given screen location must be read out seven times for each character. Any entry or deletion of information, such as a name, in the core memory 50 is performed while the read-write cycle is in progress. This feature allows each of the names presently in the core memory 50 to be evaluated, i.e. tested for alphabetical position, and compared with the name being inserted so that the new name can also be stored in alphabetical order.

Figure 5:
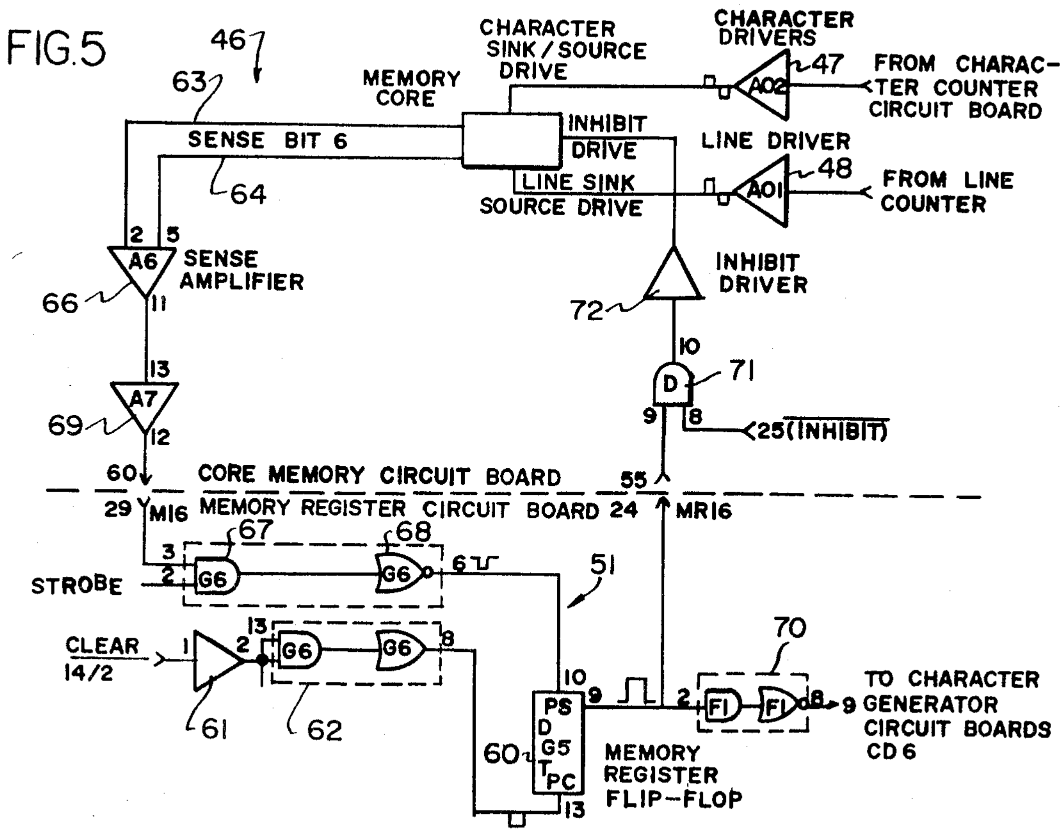
FIG. 5 is a more detailed block diagram illustrating the interconnection between the memory registry circuit and the memory core device used to store information in alphabetical order.
Figure 6:
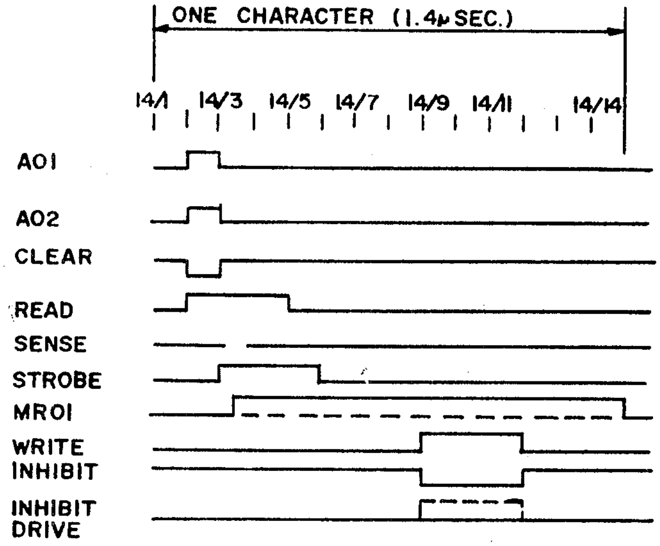
FIG. 6 illustrates the pulse sequence of control signals applied to the circuit arrangement of FIG. 5.

For each character location of the core memory 50, there is associated six bits of binary storage, each bit representing either a 1 or a 0, and all memory cores of the six binary bits are operated in parallel. Therefore, for purposes of simplicity, the description of FIGS. 5 and 6 will correspond to one bit, it being understood that the other five bits will be operated on in the same manner. FIG. 5 is a more detailed schematic block diagram of the memory circuit 46 showing the various connections between circuit components while FIG. 6 illustrates the pulse signal information from the MOD 14 counter-divider occurring at various circuit points of FIG. 5. The memory circuit arrangement is again designated by reference numeral 46, thus corresponding to the memory circuit portion 46 of FIG. 3.

The memory circuit 46 operates on a time cycle basis corresponding to a time duration based on output pulses from the clock oscillator 40. Here the read cycle is initiated at time interval 14/2, shown in FIG. 6 at A01 output and A02 output which are coincident current pulses delivered by the character driver 47 and line driver 48, respectively. These currents, which operate in coincident, will select one of 720 character positions allocated to the display screen of the television monitors 16 of FIG. 1. At the same time, i.e. 14/2 pulse interval, a pulse is applied to the memory register flip flop circuit 60 through an amplifier 61 and series connected gates 62. This latter signal is used in anticipation of new name information being inserted into the system. A strobe pulse is initiated at time interval 14/3, and if bit 1 of the character position is in the "1" or set condition, a differential pulse from the sense lines 63 and 64 to be amplified by the sense amplifier 66 and gaited with the Strobe signal at the AND gate 67 and an OR gate 68. An isolation amplifier 69 may be provided between the sense amplifier 66 and the AND gate circuit 67. The output of the AND gate 67 is applied to the inverter gate 68 to produce a negative pulse to the input of the memory register flip flop 60.

As mentioned hereinabove, the read cycle is destructive in that it requires the signal to be replaced in the core memory 50. However, during this time, the bit just read, previously a "1", is now a "0." The original status of the core memory is stored in the memory register flip flop 60 which also serves as the interface connection between the core memory and other circuit connections of the system. That is, the output of the flip flop 60 is connected to the character generator 42, of FIG. 3, through an isolation gate and inverter circuit 70. Therefore, while information is readily stored within the core memory 50, only that information which arrives at the memory register flip flop 60 can be used in the system to generate character information to be displayed by the television monitors 16. To determine the character location on the screen of the television monitors, strict timing is necessary for the sequential operation of the memory read out and memory register operation. By properly timing all functions, such as the read out, read in and insertion of new names into the core memory 50, information can be stored therein in alphabetical order.

Information is temporarily stored in the memory register flip flop 60 and must be reinserted into the core memory 50 before a new character location can be interrogated. The reinsertion of the information is referred to as the write cycle. During this write cycle, the character driver 47 and the line driver 48 again provide coincident pulses at the same character location within the core memory 50. However, in this instance the currents are equal and of opposite polarity than the read currents previously applied. This action will then set the core memory element to a "1" bit condition. To prevent a set condition from occurring when the previous condition of the core was initially "0" an inhibit signal is provided at AND gate 71 which, in turn, is coupled to the core memory 50 through an inhibit driver 72. This will cancel one of the drive currents to the memory, thus preventing the memory core element from being reset to a "1" bit condition. It will be noted that the inhibit driver 72 is rendered conductive only if a memory core element is to be a "0" and only during the write operation.

The sense amplifier 66 is a high gain differential amplifier capable of receiving low level signal information and amplifying the same to a useable output signal for the memory register flip flop 60. There are six memory register flip flops 60, one for each of the six bits of information corresponding to the binary code of a character location. Each of the six memory register flip flops are set during each read cycle, and the particular output condition is used to reset the memory core to the original condition and to operate the character generator 42, of FIG. 3.

The memory circuit 46 operates as a compare loop circuit in conjunction with a plurality of similar circuit arrangements, up to six bits for the particular system illustrated herein, and functions in combination with additional circuitry to provide alphabetical insertion of names into the core memory 50.

Figure 7A:
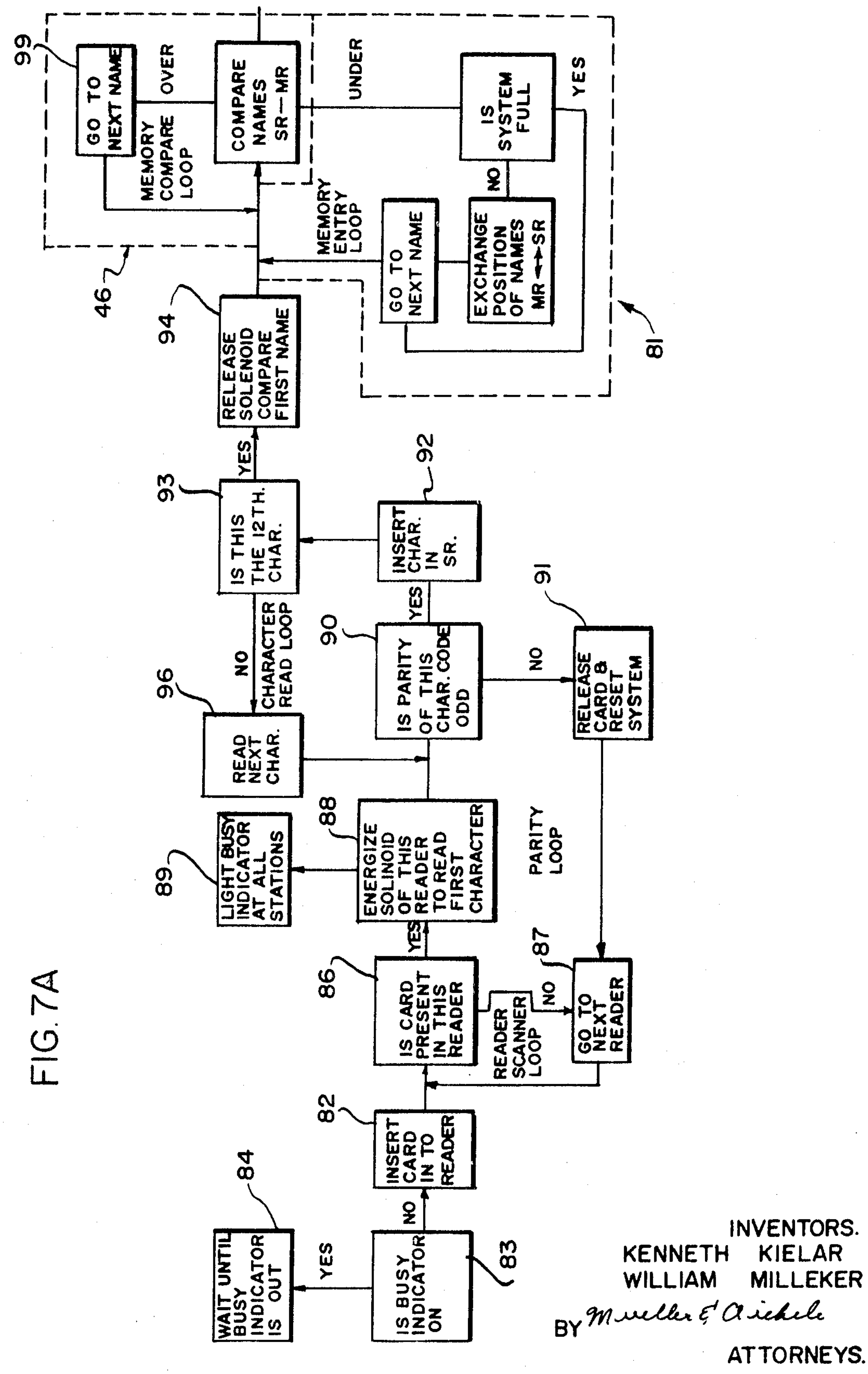
FIGS. 7A and 7B illustrate the operation of the system by a simplified block diagram showing the various functions to be performed during a given sequence.
Figure 7B:
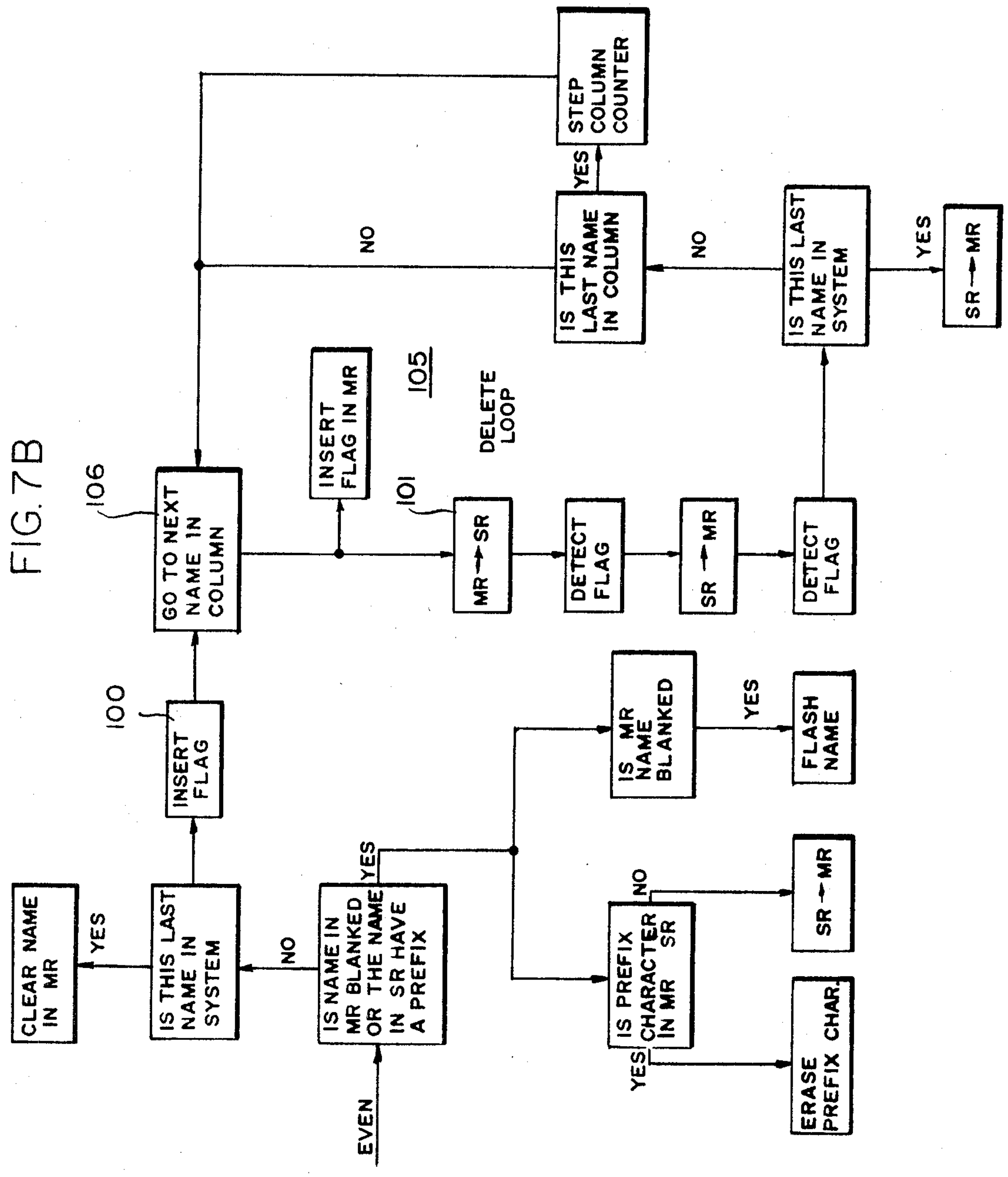

For a better understanding of the novel concepts of this invention, reference is now made to FIGS. 7A and 7B which combine to form a single functional flow diagram of signal information being handled through the data storage and display system of this invention. The memory circuit arrangement 46 is shown on FIG. 7A and includes a memory entry loop circuit 81, arranged in accordance with this invention. The general operational characteristics of the flow diagrams of FIGS. 7A and 7B can be more fully understood by reference to the legends thereon. When a card 24, FIG. 2, is inserted into the register-in unit 12, a series of automatic functions are initiated to read the coded information from the card to generate binary signal information to be translated through the system and stored in the core memory 50.

Figure 10:
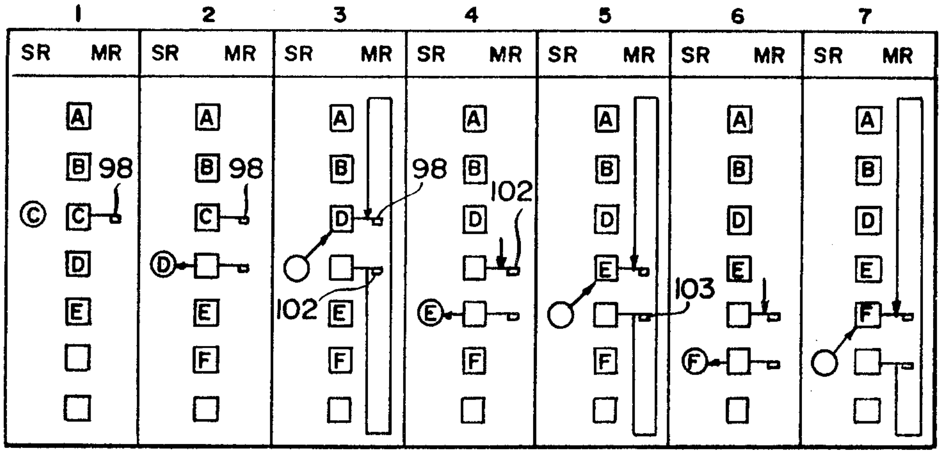
FIG. 10 is an delete cycle functional diagram diagrammatically showing the operation of the circuits of this invention to delete a name from the memory and shift all other names retained therein up one space in alphabetical order.

For example, the function diagram of FIGS. 7A and 7B illustrate the operation of the data storage and display system, and is here illustrating a delete cycle function which occurs when a card is inserted into the in/out register unit 12 for the second time, i.e. when the doctor is leaving the hospital. Also, for a better understanding of the function operation of FIGS. 7A and 7B, reference will also be made to FIG. 10 illustrating diagrammatically seven name positions with only six names registered in the system, it being understood that this is for purpose of illustration only. For convenience the names registered in the system are designated A, B, C, D and F, each representing a doctor's name. For example, if Doctor C is going to leave the hospital, his card is inserted into the register unit 12, as indicated by the function designated by reference numeral 82. A circuit function 83 determines whether the other register-in/out units are being used at the time Doctor C has inserted his card and will produce a yes or no signal. The yes signal activates circuitry which will wait till the busy indicator is deactivated, this being indicated by reference numeral 84. When the busy indicator is deactivated, the card reader will deliver the signal information to the memory compare loop 46. However, before the signal is delivered thereto, a plurality of checking functions are encountered. For example, a circuit function 86 determines whether a card is present in the card reader to apply a signal to a circuit function go to next reader 87 which then produces a similar input and so on, and then back to the input of the circuit function 86 to scan all of the card readers sequentially, one after the other, in a relatively short period of time. For example, the output of the circuit function 86 is applied to an energized solenoid of the reader in which the card is inserted, this function being designated by reference numeral 88 which will lock out all other card readers and energize the busy-light indicator 89 at all other stations. The output of circuit function 88 is delivered to a circuit function where the parity of the card and character code are checked, as designated by reference numeral 90. A bad card will produce a no output to a release-card-and-reset-system 91 which will activate the cyclic function of scanning each of the card readers in the system. Therefore, if a bad card is inserted into a card reader and left there, other card readers will still operate properly when a good card is inserted therein. A yes output from the parity checker 90 will then cause signal information to be inserted into the memory compare loop 46 by the use of an insert character in shift register circuit 92, the output of which goes to a character counter 93. The output of the character counter circuit function 93 is delivered to a release solenoid compare first name circuit function 94 at the completion of the 12th character while each character between 1 and 12 will produce an output delivered to the read next character circuit function 96.

It will be noted that one output of the memory compare loop is designated "even." This indicates that the name inserted in the shift register is the same as the name in the memory register. If we assume that the name being inserted is not blanked and that the compared name, in the memory, is not the last name in the system, a flag indicator is inserted in the memory register at this location, as indicated by reference numeral 98 of FIG. 10. The flag is merely an electronic pulse in the circuit to activate the appropriate memory register flip flop. Most advantageously, the memory cycle of the data storage and display system of this invention proceeds only in one direction and therefore, can check information already in the memory and compare it with a weighted code corresponding to its alphabetical characteristic. To find the location that has been past, it is necessary to complete the cycle and start through it again to arrive at the past position. The flag indicator 98, of FIG. 10, is a portion of the first character code used to mark a memory location for a latter cycle, this being two bits of the binary character information. The flag insertion is represented in FIG. 10 adjacent each even name. That is, upon insertion of a card for the second time, a name is to be removed from the system and each name remaining in the system is moved up one to fill in the space. Therefore, upon removal of the name of Doctor C, each name remaining in the system below his name must be taken out of memory and shifted up to a new position.

The second position in FIG. 10 represents three actions to be performed by the flow diagram of FIGS. 7A and 7B. That is, the circuit function go to the next name 99 within the memory compare loop 46, insert flag function 100, of FIG. 7B and the (memory register to shift register) MR to SR function 101 are activated. This transfers the name following the even name into the shift register. The even name is deleted at this point, moved out of the shift register as the following name is moved in. The third position on the diagram of FIG. 10 represents the delete flag 102 being inserted at the location where Doctor D's name was located. This is the shift register to memory register function. Starting past the last inserted flag, illustrated by the fourth step in FIG. 10, the next flag is found after covering all memory positions after the "following name" position, i.e. Doctor D, and returning to the position of the "even name", i.e. Doctor C, this being one name before the "following name" position. The "following name" is then moved from the shift register to the memory register. At this point, the complete memory and display includes Doctors A, B and D followed by a space and then continuing with Doctors E and F. In other words, only Doctor D's name was shifted up in position during this cyclic operation. Also, note that the flag 98 is removed adjacent Doctor D's name in position 4 of FIG. 10.

The next step, as indicated in FIG. 7B, and position 4 of FIG. 10, is the removal of Doctor E's name from the core memory and the insertion of a flag 103 adjacent this name position. However, if we assume that this is not the last name in the system nor the last name in a column, the delete loop 105, of FIG. 7B, is repeated thus activating the circuit function "go to the next name in column" 106 and the circuit function "insert flag" as well as the circuit function "memory register to shift register."

Station 5, of FIG. 10, illustrates that after Doctor E's name has been placed in the shift register, it is moved upwardly to the memory register to the location where Doctor D's name was previously inserted. This again is illustrated as a complete cyclic operation. Stations 6 and 7 of block diagrams of FIG. 10 are the same in function as stations 5 and 6 except that a different name is being operated on, and it will be understood that all subsequent names will be operated on in the same manner to shift them up one position so that all names remaining in the data storage and display system will be displayed in alphabetical order and without wide spaces between names.

The cycle of reading the names in the core memory continues through the delete loop until the last name in a column is reached. At this point an additional step is inserted to shift to the next column. After the third column shift has been completed, the MOD 4 channel counter, of FIG. 4, is advanced and the cycle is repeated for another 60 names. After the last name registered in the system is reached by the cyclic scanning operation described hereinabove, the cycle will continue around the delete loop 105 of FIG. 7B by moving up the names to the previous empty space until the last name is reached.

If the name to be deleted from the system happens to be the last name in the system, the delete process is greatly simplified. For example, the "even" output signal from the compare loop 46 is merely cleared in the memory register. This is possible in the illustrated embodiment of this invention because no step-up process of names remaining in the system is required to fill in a vacant space.

In the case of a blank name, one inserted by the switchboard operator to indicate to a doctor registering in that he has calls already waiting, no deletion process is required. The operator has entered the name previously to delete the doctor registering in, and in this case, his name will appear in a flashing condition until stopped by the operator.

If the name in the shift register has a prefix associated with it, thus indicating that the doctor may be in an isolated area of the hospital where he is not to be disturbed, the register-delete process is not activated. If the prefix is the same at the second insertion, only the prefix character in the memory register is deleted.

Figure 8A:
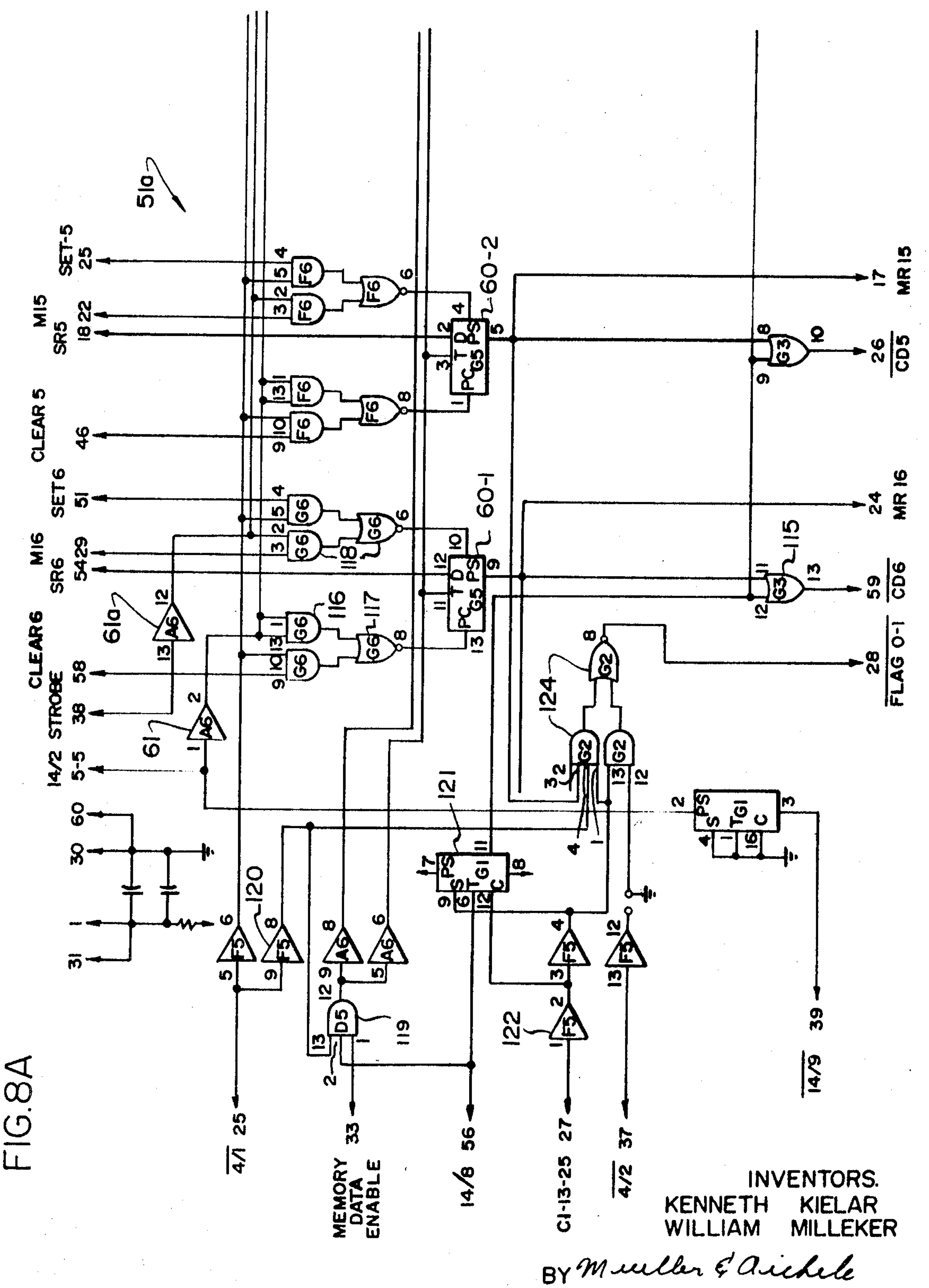
FIGS. 8A and 8B are detailed block diagrams of a memory register circuit used in accordance with this invention.
Figure 8B:
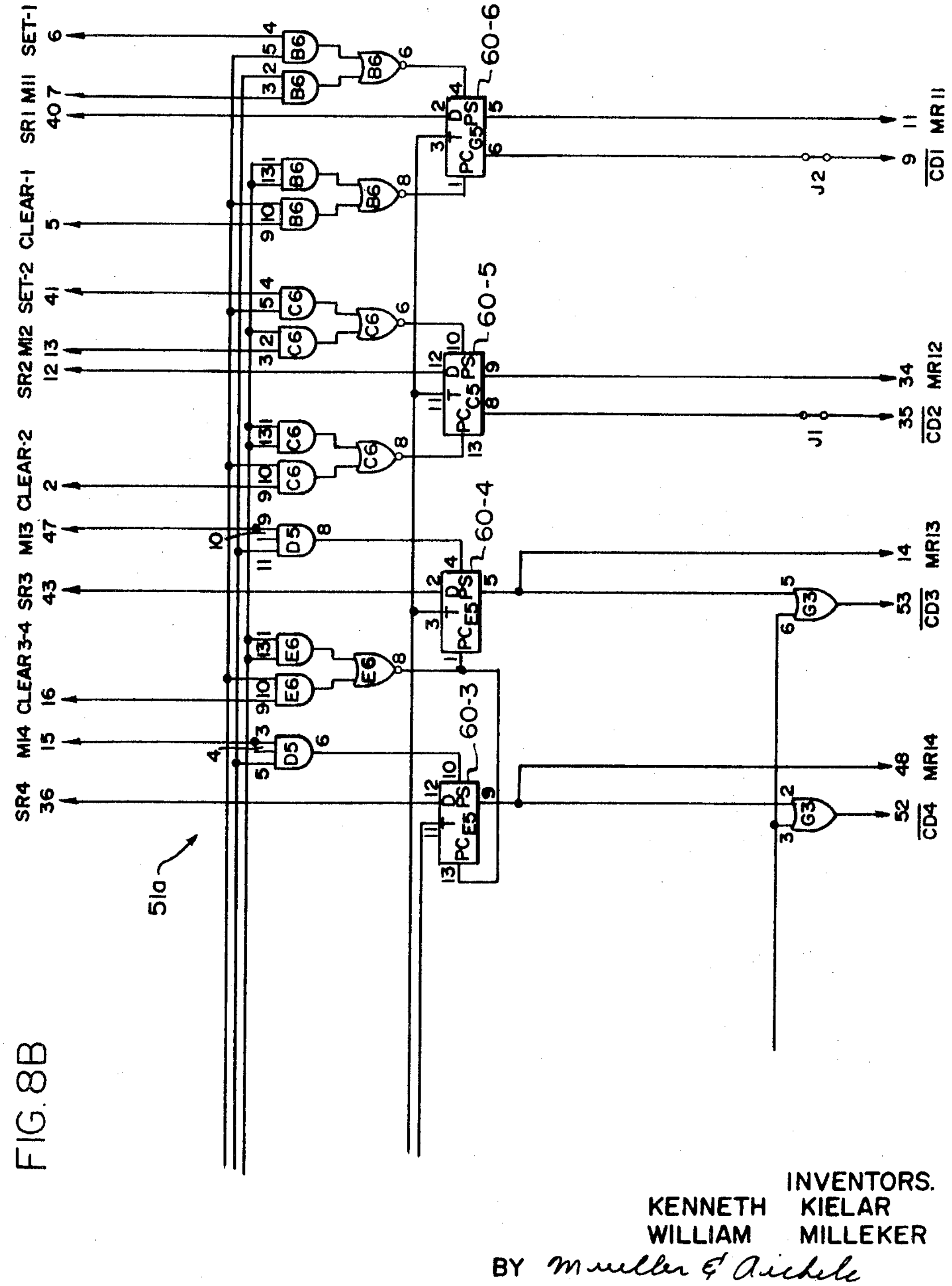

FIGS. 8A and 8B form a schematic block diagram of the memory register circuit which is constructed and utilized in accordance with this invention. FIG. 8A is to be placed to the left of FIG. 8B. The memory register circuit corresponds to the memory register circuit 51 of FIGS. 3 and 5, but is here designated by reference numeral 51*a* as all six memory register portions are illustrated for the six bit binary code for each character stored within the core memory. Here, the memory register flip flops are designated 60–1, 60–2, 60–3, 60–4, 60–5 and 60–6, thus corresponding to the memory register 60 of FIG. 5. The amplifier 61 is connected to one input of each of the flip flops 60–1 to 60–6, while a second amplifier stage 61*a* is connected to another input of these flip flops.

This memory register circuit arrangement serves as a temporary memory for storage of the character bit signal information as it is read out of the core memory. The memory register information is utilized during each memory cycle and then restored to the core memory for permanent storage so long as this particular bit signal information remains in the system. The bit signal information corresponding to the particular character to be reproduced is always in binary form with a maximum of six character bits for each alphanumeric character to be generated. The six bit register 51*a* handles one alphanumeric character at a time, and this time interval is 1.4 microseconds, in the embodiment illustrated herein, thus corresponding to the output rates from the MOD 14 counter-divider.

Since the circuit function of all six bits within the memory register circuit 51*a* is substantially the same, only one such circuit operation on a bit will be described. Here the output of memory register flip flop 60–1 is obtained at terminal 9 and this output is applied through an OR gate 115 and thence to the character generator. However, before character signal information is entered during a quiescence cycle, a 14/2 pulse, of FIG. 4A, is applied to pin 55 of the circuit board forming the memory register 51*a*, at the top of FIG. 8A. The downswing of this pulse resets the flip flop 60–1, as well as other actuated flip flops. The circuit path is through the inverter amplifier 61*a* and NAND and NOR gates 116 and 117, respectively, connected in series therewith This negative pulse is applied to the input at terminal 13 of the flip flop 60–1 and acts to reset the circuit. However, if it is already reset, no change will take place; but if set, a reset will occur. After the reset pulse, the output at pin 9 of the flip flop 60–1 will be in a low voltage condition regardless of the previous condition of the flip flop.

At time intervals 14/3 through 14/4, as corresponding to the time pulses of FIG. 4A, a $\overline{\text{STROBE}}$ signal is applied to the inverter amplifier 61*a* and therefrom to the NAND-NOR gate combination 118. If an element of the core memory being read out for a particular character bit is in the "1" state, a SENSE pulse will appear at the other input of the NAND gate 118 to provide an output signal through the NOR portion thereof. This signal indicates that there was a "1" bit stored in the core memory. That is, the positive signal applied to the input of the NAND gate 118 will produce a negative output signal at the NOR gate portion thereof to set the flip flop 60–1. This action will cause the output pin 9 of flip flop 60–1 to go to the "1" state, or high state, and will remain in this state until the next 14/2 reset pulse occurs to reset the flip flops.

The output of flip flop 60–1 is connected directly to one output terminal where the output signal is designated MR 16. This designation corresponds to memory register, channel 1, bit 6, and is used on the memory circuit board throughout to replace the character signal information for the next cycle. The same signal is connected through the NOR gate 115 to produce the CD 6 output signal, which is a low character signal information and is used for the continuing display of the particular character being interrogated into the core memory.

Most advantageously, the new data from the card reader 12*b* in entered into the core memory 50 from the shift register at a particular point in time during each cycle. This time, for the channel being considered here, is determined by the AND gate 119 which receives signals corresponding to 4/1, passing through the inverter 120, a MEMORY DATA ENABLE signal directly applied thereto, and a 14/8 signal. At this time a trigger pulse is connected to pin 11 input of flip flop 60–1 and any data signal information from SR 6 at pin 54, at the top of FIG. 8A, is transferred through the flip flop 60–1 and the NOR gate 115 to the character generator. The SET and CLEAR inputs are gated with the channel inputs to set and clear the flip flop 60–1 at the appropriate time during the cycle. These signals are generated from the operator console board when the appropriate keys are pressed by the operator to insert the alphanumeric characters into the system. These pulses occur at 14/8 time interval of the pulse time sequence of FIG. 6 so that the information received from the memory at time interval 14/2 is changed.

As mentioned previously, the above description is directed to a one channel system in which case the 4/1 signal at the input of the inverter 120 is used to control the input of data from the shift register and the operator switchboard console. In a multi-channel system, identical memory circuits for each channel of information are used.

A standard JK flip flop circuit 121 will have a positive output signal at pin 11 thereof when the pin 9 input thereof is in the high state and the pin 12 input thereof is in the low state and a 14/8 pulse appears at the input pin 6. This condition is true only during the first character time of each name line in each column. During these time intervals, a positive voltage is present at circuit input terminal 27 which is connected to an inverter circuit 122, thus the JK flip flop circuit 121 will have inputs at terminals 9 and 12 thereof of the required voltage for a positive output at the output terminal 11 and will appear at the NOR gate 115, as well as the other NOR gates, as seen in FIGS. 8A and 8B. This allows a double use of this line for control purposes at the 1, 13 and 25 character time intervals corresponding to the character space preceding each column. At the same time, the output signals from flip flop circuit 60–1 and 60–2 are used by the NAND-NOR gate circuit 124 to produce the flag 0–1 signal output at terminal 28 of the circuit board. Most advantageously, this flag signal is used to insert and delete names from the core memory 50 in the proper alphabetical order as described hereinabove with respect to FIGS. 7A and 7B and FIG. 10. This novel circuit arrangement allows for automatic alphabetizing of information into permanent memory storage by the mere insertion of a punched card having the information formed thereon, and such punched card can be inserted into a card reader in any alphabetical order.

Figure 9A:
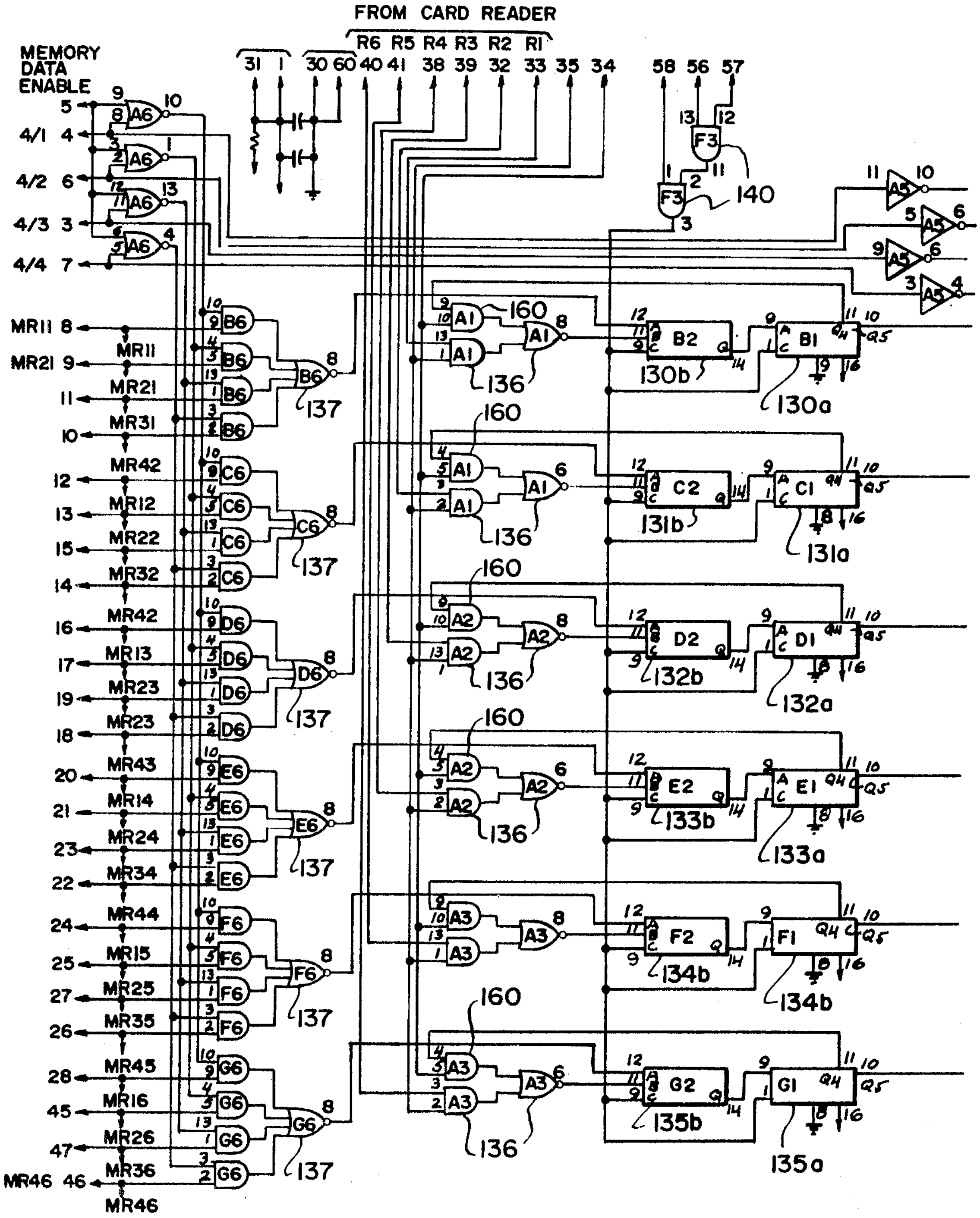
FIGS. 9A and 9B are detailed block diagrams of a shift register circuit used in conjunction with the memory register circuit of FIGS. 8A and 8B, in accordance with this invention.
Figure 9B:
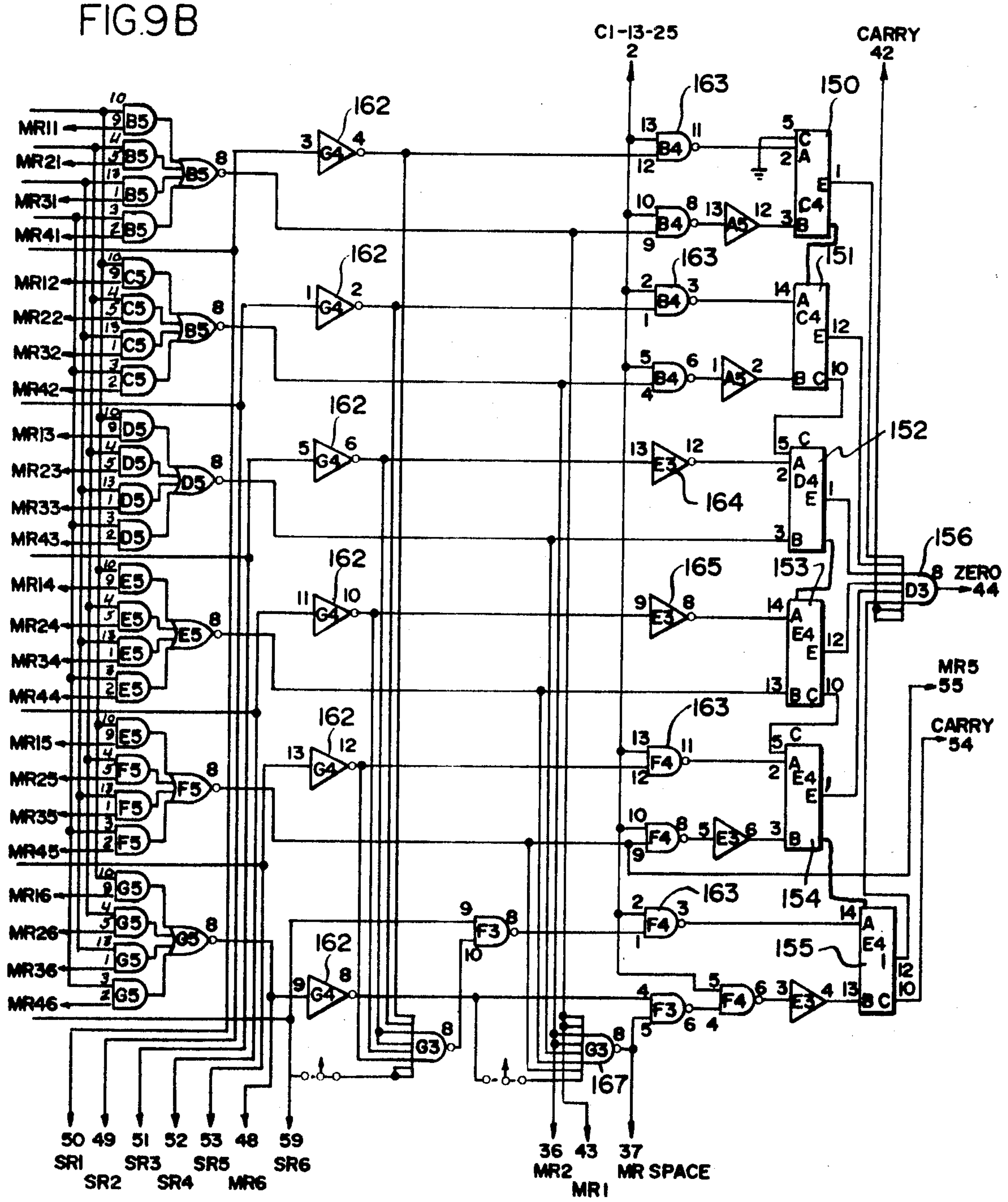

Referring now to FIGS. 9A and 9B, there is seen the shift register circuit block diagram used in the illustrated embodiment of this invention to enable alphabetical storing of data signal information in the system of this invention. This shift register circuit includes all shift registers and comparing circuits necessary to evaluate each character of a name being inserted with existing names in the memory. The shift register circuit of FIGS. 9A and 9B may be considered as six sets of 13 flip flop circuits with each flip flop circuit registering one bit at a time of character information. Therefore, the six sets of flip flops are used for the six bits of information corresponding to the particular alphanumeric character being inserted into the system. However, only 12 of the 13 flip flop circuits in each set are required for the 12 characters of a name and the 13th flip flop circuit is required for the shift operation to the next row in the particular column involved.

Each set of flip flops is designated 130*a*, 130*b*; 131*a*, 131*b*; 132*a*, 132*b*; 133*a*, 133*b*; 134*a*, 134*b*; and 135*a*, 135*b*. The flip flop circuits 130*a*, 130*b*–135*a*, 135*b* are each connected in series so that the output of the first, i.e. 130*a*, is fed into the input of the second, and the output of the second is fed into the input of the third and so on until the last set of flip flops. The input terminals 11 and 12 of flip flop 130*b* are connected to the output NOR gates 136 and 137, respectively, and the output terminal 10 of flip flop 130*a* represents the 13th position or stage of a name in a column and the output at terminal 11 of flip flop 130*a* represents the 12th position in that name. A clock pulse is derived at the output of the AND gate 140 and applied to input 9 of flip flop 130*b*, as well as input 9 of each of the other corresponding flip flop circuits 131*b*, etc. On the appropriate clock pulse, data is shifted one step in the sequence of shifting or inserting name information.

The shift register of FIGS. 9A and 9B is operated in three distinct modes. Initially, when a card 24 is inserted into the card reader 12*b*, the names are temporarily stored into the shift register. This operation consists of shifting 12 characters, with each character consisting of six binary bits, into the register and holding this information until compared with existing stored information. Then the name in the shift register is inserted into the core memory in its proper alphabetical position. Each character of a name inserted is compared one character at a time so that similar names, with only one character difference, can be differentiated and properly located. The character being compared at this particular point in time appears at the output terminal 10 of flip flop 130*a*, when the next character is to be compared, this output is shifted back into the input and the following character appears again in output terminal 10 of flip flop 130*a*. This operation allows the system to compare each character sequentially and retain all of the bits of information corresponding to that character for future use. When data is to be inserted into the memory, the data is transferred to the memory register first. In conjunction with this operation, the data from the memory is transferred to the shift register of FIGS. 9A and 9B. This operation will be discussed more fully hereinbelow, but with respect only to one bit of information since all other bits are handled identically.

Binary code information from the card reader is applied to the input terminals designated R1, R2, R3, R4, R5 and R6 at the top of FIG. 9A. This signal information is developed simultaneously with input signals from the input terminal 35 and a signal from input terminal 58. The input signal at terminal 35 will be high, thus allowing bit "1" to be gated through the AND-OR gate 136 and therefrom to the input of the shift register flip flop 130*b*. The signal from input terminal 58 will be inverted through the gate 140 to produce a positive pulse at pin 9 input of the shift register flip flop 130*b*, as well as the other shift registers. This pulse will shift the code information from the card reader on input terminals designated R1–R6 into the shift register. With each pulse applied to the input terminal 58, a new character data information will appear at the input terminals R1–R6. When the operation is complete, the first character to be read by the card reader will have been shifted through the shift register to the last stage.

The name within the shift register is compared with the names in the memory register cyclically, one after another, to determine at which location the name just inserted into the shift register should be stored in the core memory. That is, the name received from the identification card 24 goes through a comparison cycle with all of the names already registered in the system. In the comparison cycle, the system adds two binary numbers in full adder circuits and uses the sum of these numbers to determine the difference between the alphabetical characters of the names being compared. Succeeding letters in the alphabet have the greater weight with letter A the minimum weight, letter B a greater weight and so on. The binary addition, when two binary codes are added together, produce results determined in terms of "1" or "0" only. The basic rules of binary addition are followed and the results are:

0+1=1, 0+0=0, 1+0=1 and 1+1=0 with a 1 carry. The carry is added to the next column to the left in the same way as ordinary addition. In the shift register of the illustrated embodiment, the system adds six digits corresponding to the six bit code of each character location.

Since all of the characters are used in this system in the binary form, the relative position of any character, with respect to any other character, can be determined by comparison of the binary codes. For example, the binary code of the letter A is 000001, and is lower in numerical order than the binary code for letter B which is 0000010. Therefore, the letter A will be placed before letter B in the alphabetical arrangement. Most advantageously, the shift register uses this technique to compare characters in the shift register with characters in the memory register. The six bits in the memory register, used to establish the character, are first inverted and then added to the six bits within the shift register. The three possibilities occurring in the summation thus provide three distinct control signals at different output circuit points to control the insert and delete functions of the system. For example, if the binary code information within the shift register equals the binary code information within the memory register, the sum will be 111111 with a carry of 0. Preferably, it is provided that the solution to the sum is always the same as long as the two numbers being added are equal thus producing the appropriate output signal to delete the name within the shift register. That is, should the card be inserted a second time, the signal information being inserted will equal the information in the memory register, thus producing the appropriate delete signal.

Should the binary signal in the shift register be greater than the binary signal in the memory register, the data from the memory register is inverted and added to the shift register with a variable result in the sum bits of (011111) with a carry of 1. The carry of 1 will be provided at all times when the binary signal of the shift register is greater than the binary signal of the memory register. Therefore, the result will be consistent and can be used to check and insert alphabetical information. On the other hand, should the binary signal of the shift register be less than the binary signal of the memory register, the result will be a binary signal when the sum is less than (111111) with a carry of 0, thus providing still a third type of binary signal output corresponding to the alphabetical weight of the character being compared.

These three conditions are used when the characters are compared in the shift register. Referring back to the schematic diagram of FIGS. 9A and 9B, six full adder circuits 150, 151, 152, 153, 154 and 155 are used to perform the addition of the binary characters. For example, the binary information from the shift register appears in the A inputs of the full adders 150 – 155 while the inverted memory register binary information appears at the B inputs of these adders. The sum appears at the E outputs with the carries appearing at the C input and outputs between adders 150 and 151, 151 and 152, 152 and 153, 153 and 154, and 154 and 155, with a carry at a C output occurring at full adder 155. When the characters, i.e. the binary codes representing characters, are added and are equal, the carry output at pin 54, of FIG. 9B, will be 0. Also, all E outputs of the full adders 150 – 155 will be 1, thus producing a 0 output at terminal 44. When the character designation in the shift register is greater than the character designation in the memory register, the output signal at carry output terminal 54 is always in the high state. When the shift register data is less than the memory register data, the carry signal at pin 54 is in the low state or 0 condition. However, one of the E outputs of the full adders will always be in a low inhibiting condition, thus producing an output through the gate circuit 156 to the output terminal 44. When a name in the shift register of FIGS. 9A and 9B is to be compared with a name in the memory register of FIGS. 8A and 8B, input terminals 34 and 57, of FIG. 9A, go to a high signal potential level. This signal is synchronized in the control system so that all 12 characters of a main line are compared. The input signal at terminal 34 gates the output of the shift register flip flops 130*a*–135*a* to provide an input to the gates 160, which gates also receive a signal from terminal 34 to enable the compare cycle. This allows the system to recirculate the information within the shift register. The clock enable input pulse at terminal 57 will gate the 14/7 signal, from the MOD 14 counter, through the gates 140 to the clock inputs at terminal 9 of the shift registers 130*b*–135*b*. The output at terminal 10 of the shift registers 130*a*–135*a* are inverted before they are applied to the full adder circuits 150 – 155. For example, this is accomplished through the inverter amplifiers 162 in series with the NAND gates 163. It will be noted that the inputs to full adders 152 and 153 are inverter circuits 164 and 165, respectively. The memory register data signal information appears at the MR inputs at the left hand side of FIG. 9A and is gated by the appropriate channel counter to cause this data to be applied to the B inputs of the full adders 150 – 155 in an inverted condition. Since all shift registers operate in an identical manner, only a sample explanation will be given herein. The line at terminal 2, of FIG. 9B, is set to a low condition during the comparison time and overrides input bits 1, 2, 5 and 6 to the full adders 150, 151, 154 and 155, respectively. Also, these bits of binary data, bits 1–5, of the data being compared also appear at the inputs of the gate 167. If all the inputs are high, indicating that all data bits are 0, the output of this gate will go low indicating that a space exists in that character location.

The memory data enable signal at terminal 5, upper left hand corner of FIG. 9A, goes low as the clock enable signal, at terminal 57, goes high, and the memory data enable signal is gated with the appropriate channel signal to produce a high output at the appropriate NOR gate circuit 136. If, for example, a 4/1 signal was in a low condition, data signal at MR 11 through MR 16, at the left side of FIG. 9A, would be gated through to the A inputs of the shift register flip flops 130*b*–135*b*. At the same time, the clock enable signal at terminal 57 in conjunction with the 14/7 pulses will shift the information through the shift registers. The original information which was in the shift register will sequentially appear at terminals labelled SR 1, SR 2, SR 4, SR 5 and SR 6 of FIGS. 8A and 8B of the memory register circuit.

What has been described therefore is a data storage and display system which has capabilities of receiving binary coded signal information in any order whatever and evaluating this information automatically to place it in proper alphabetical order within a core memory storage whereupon the information is read out and displayed on a television monitor in alphabetical order. The data is inserted into the system by the use of a card which is inserted a first time to place information into the system and inserted a second time to delete the information.

Accordingly, it will be understood that variations and modifications of this invention may be effected without departing from the spirit and scope of the novel concepts disclosed and claimed herein.

We claim:

1. A data storage and display system including in combination:

visual read out means to display alphanumeric information in at least one column;

input means to receive at random, and in any order, alphanumeric signal information to be stored and displayed in the system;

permanent memory means for receiving and storing said alphanumeric signal information;

memory register means coupled to said read out means and to said permanent memory means to receive said alphanumeric signal information from said permanent memory means during read out thereof to cause an alphanumeric display of a character on said read out means;

shift register means connected to said memory register means and said input means to receive presently inserted alphanumeric signal information from said memory register means and compare it with alphanumeric signal information in said shift register means from said input means to provide a first control signal in response to signal information from said memory register means which is different from said information in said shift register means and a second control signal in response to signal information from said memory register means which is the same as said information in said shift register means; and means connected to said shift register means coupling said first control signal to said permanent memory means for inserting the alphanumeric character information into the permanent memory means, and coupling said second control signal to said memory register means to delete pre-existing alphanumeric information from said permanent memory means.

2. The data storage and display system of claim 1 further including means responsive to said second control signal to shift all information displayed in a column below information being removed to fill the blank space provided by the deleted alphanumeric signal information.

3. The data storage and display system of claim 1 wherein said input means is a card reader to scan an identification card insertable therein having coded information formed on the identification card designating the data to be stored in the system, said data corresponding to alphanumeric character information to be stored in alphabetical order, and including identification card means having an embossed area thereon containing said alphanumeric signal information in coded form.

4. The data storage and display system of claim 1 wherein said permanent memory means, said memory register means, and said shift register means each include six parallel circuit portions for receiving six bit binary code information corresponding to a particular alphanumeric character to be stored and displayed in the system.

5. The data storage and display system of claim 1 wherein said input means includes a plurality of register-in units, each adapted to receive an identification card, and circuit means connected to said register-in units and cyclically operable to activate the units one at a time to read a card inserted in one of said units.

6. The data storage and display system of claim 5 further including circuit means to lock out all other register-in units not being activated by an identification card inserted therein.

7. The data storage and display system of claim 1 wherein the alphanumeric signal information is a plurality of names, and said second control signal provided by said shift register means operates said memory register means to receive signal information corresponding to names following a name being deleted, such that the first following name is placed in storage and reinserted into said permanent memory means in the position of the name being deleted, and the second following name is placed in said memory register means and reinserted into said permanent memory at a location where the first following name was located and so on cyclically until all names below the deleted name are shifted up one position.

8. A data storage and display system including, in combination:

read out means visually to display alphanumeric information in at least one column on a visible portion thereof in a predetermined order;

a character generator coupled to said read out means to apply signals thereto to form the alphanumeric information on the visible portion of said read out means;

memory storage means for storing binary data indicative of alphanumeric information, said memory storing means including adder means for receiving the binary data in said memory storage means in a predetermined order;

signal means to interrogate said memory storage means cyclically to read the information stored therein and apply the same to said character generator to produce a display on the visible portion of said read out means in said predetermined order; and input means connected to said memory storage means to insert binary data corresponding to alphanumeric information into said memory storage means at random, and in any order, said input binary data being applied to said adder means of said memory storage means evaluate the information received and place the same in storage in said predetermined order.

9. The data storage and display system of claim 8 including identification card means having an embossed area thereon containing said alphanumeric signal information in coded form, said card having a margin portion and said embossed area being 1½ by 2½ inches adjacent one margin portion of said card, and wherein said input means includes a card reader to scan said identification card inserted therein to derive therefrom data corresponding to alphanumeric character information to be stored in said memory storage means.

10. The data storage and display system of claim 8 wherein said input means includes a plurality of register-in units, each adapted to receive an identification card, and circuit means coupled to said register-in units and cyclically operable to activate said units one at a time to read a card inserted in one of said units.

11. The data storage and display system of claim 10 further including circuit means to lock out all other register-in units not being activated by an identification card inserted therein.

12. The data storage and display system of claim 8 wherein said adder means includes a plurality of adder circuits, each having a first input coupled to said memory storage means and a second input coupled to said input means, and output means associated with said plurality of adder circuits to develop a first control signal indicative of the sameness of the signals at said first and second inputs of said adder circuits to delete the signal information from said memory storage means, said output means acting to develop a second control signal indicative of a first difference between the signals at said first and second inputs of said adder circuits to shift the signal information from said memory storage means to a next position, and to compare the subsequent alphanumeric signal information from said memory storage means in said predetermined order with the signal from said input means, said output means further acting to develop a third control signal indicative of a second difference between the signals at said first and second inputs to said adder circuits, said third signal being coupled to said memory storage means to insert the signal information from said input means into said memory storage means in said predetermined order.

13. The data storage and display system of claim 8 wherein said character generator includes means electronically to form the alphanumeric information on the visible portion of said read out means.

14. In a data storage and display system having read out means visually to display alphanumeric information in at least one column, input means to receive at random, and in any order, alphanumeric signal information to be stored and displayed in the system, memory means for receiving and storing said alphanumeric signal information in a predetermined order, and character generator means to develop signals for producing alphanumeric characters on said read out means in response to the information stored in said memory means, the combination including:

shift register means connected to said memory means and said input means and including means to receive stored alphanumeric signal information from said memory means in said predetermined order and compare it with input alphanumeric signal information from said input means to develop a first control signal in response to stored information of higher order than the input information, and a second control signal in response to stored information of lower order than said input information; and memory register means coupled to said shift register means and responsive to said first control signal for activating the memory means to reinsert the alphanumeric signal information therefrom back into the memory means in said predetermined order, said memory register means acting in response to said second control signal to insert the alphanumeric signal information from said input means in said memory means in accordance with said predetermined order.

15. The combination of claim 14 wherein said shift register means includes, a plurality of adder circuits each having a first input for receiving signal information already stored in said memory means and each having a second input for receiving signal information from said input means;

means for sequentially applying signal information from said memory means to said first input of said adder circuits in a predetermined order and comparing such signal information with the signal information at said second input of said adder circuits; and gate means associated with said plurality of adder circuits at the outputs thereof to selectively develop said first and second control signals, said first control signal being responsive to a difference of signal information at said first and second inputs of said adder circuits to develop a signal to cycle the signal information from said memory means to a next position of said memory means in said predetermined order, and said second signal being responsive to the difference of the signal information at said first and second inputs of said adders to develop a signal to cause insertion of the signal information from the input means into said memory means in said predetermined order.

16. A circuit for developing control signals in response to coded signal information from a data input circuit to cause storage or deletion of such signal information in memory means in a predetermined order, comprising:

a plurality of adder circuits each having a first input for receiving signal information already stored in said memory means and a second input for receiving signal information from said data input circuit;

means for sequentially applying signal information from the memory means to said first inputs of said adder circuits in a predetermined order and for applying signal information from the data input circuit to said second inputs, said adder circuits comparing the signal information at said first and second inputs of said adder circuits;

gate means associated with said plurality of adder circuits at the outputs thereof to develop first and second control signals, said first control signal being responsive to a first difference of signal information at said first and second inputs of said adder circuits and said second signal being responsive to a second difference of the signal information at said first and second inputs of said adder circuits; and means coupled to said gate means and to the memory means and responsive to said first control signal to cycle the signal information from the memory means back into the memory means, and responsive to said second control signal to cause insertion of the signal information from the input circuit into said memory means in said predetermined order.

17. The system of claim 12 wherein said alphanumeric information includes a plurality of names, and wherein said output means develops said second control signal in response to signals applied to said first inputs of said adder circuits representing names having a higher alphabetic order than the names represented by signals applied to said second inputs, and said output means develops said third signal in response to signals applied to said first inputs of said adder circuits representing names of lower alphabetic order than the names represented by signals applied to said second inputs.

18. The system of claim 17 wherein said signal means includes means to interrupt the display of one of said names to cause attention to the same.

* * * * *